June 24, 1924.

D. KWON

HEAT DISTRIBUTOR

Filed July 6, 1923

INVENTOR.
Doin Kwon,
BY Victor J. Evans
ATTORNEYS.

Patented June 24, 1924.

1,499,226

UNITED STATES PATENT OFFICE.

DOIN KWON, OF HONOLULU, TERRITORY OF HAWAII.

HEAT DISTRIBUTOR.

Application filed July 6, 1923. Serial No. 649,965.

*To all whom it may concern:*

Be it known that I, DOIN KWON, a citizen of Korea, residing at Honolulu, Territory of Hawaii, have invented new and useful Improvements in Heat Distributors, of which the following is a specification.

This invention relates to improvements in heat distributors and has particular reference to a device capable of being placed upon an oil stove for the purpose of distributing heat evenly to a receptacle placed upon the distributor.

The principal object of this invention is to provide a cheap and efficient device, which will catch the heat rising from a flame having hot spots and dissipating the heat so that it is evenly distributed over a given area.

Another object is to provide a device which at the same time will act as a receptacle for the purpose of receiving any liquid which may be discharged from the receptacle placed thereon such as a boiling over of the contents of the receptacle.

Other objects and advantages will be apparent during the course of the following description.

Figure 1:
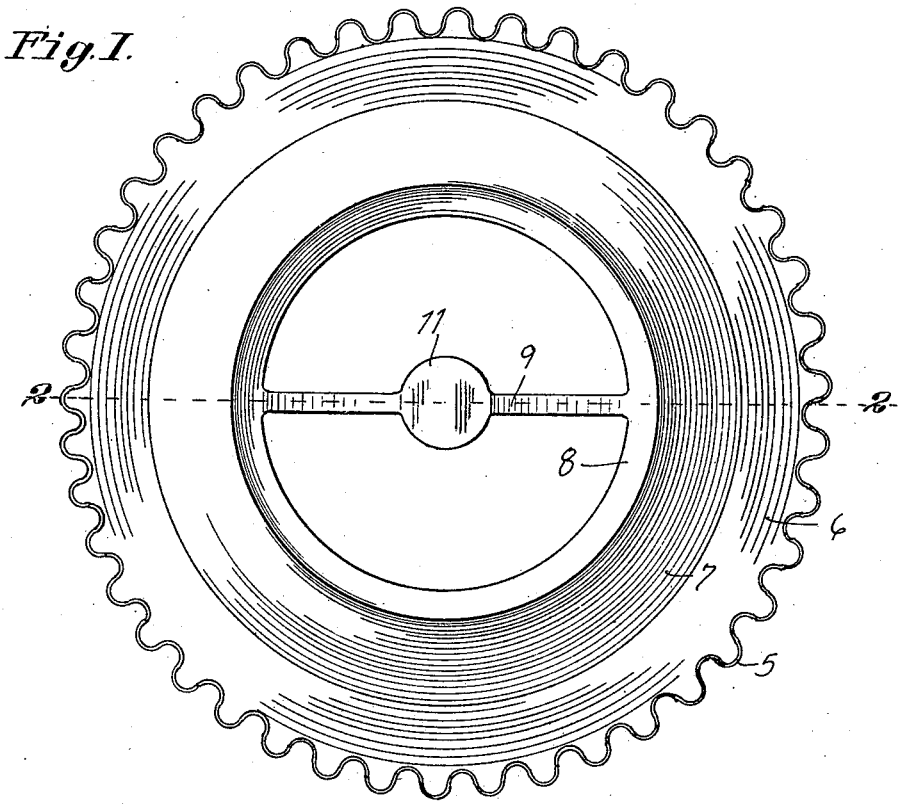
Figure 2:
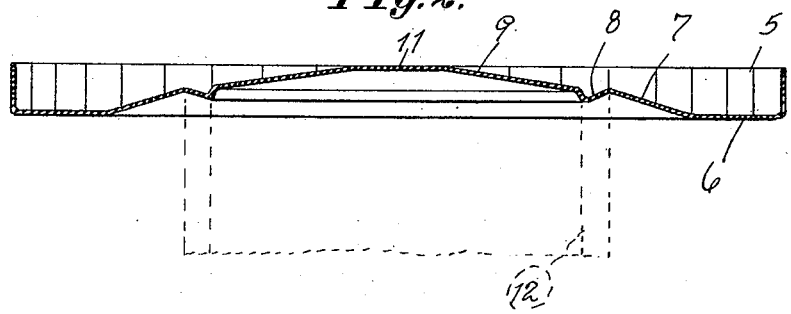

In the accompanying drawings forming a part of this specification, and in which like numerals are employed to designate like parts throughout the same, Figure 1 is a top plan view of my device, and Figure 2 is a cross section taken on the line 2—2 of Figure 1.

Applicant is aware of the fact that sheets of metal have been placed over a stove for the purpose of distributing heat. It has been found from experience that a sheet of metal distributes the heat to such an extent that much of it is lost, consequently, I have devised a heat distributor which will receive much of the heat from the stove and convey the same to the receptacle placed thereon.

In the accompanying drawings wherein for the purpose of illustration is shown a preferred embodiment of my invention, the numeral 5 designates a corrugated upstanding rim which is preferably formed integral with a flat ring portion 6. This ring portion is in turn formed integral with an annular inclined portion 7 having a depressed rib 8 upon its inner margin. A transverse member 9 joins the opposite sides of this rib and is provided mid-way of its length with a circular rest 11.

By viewing Figure 2, it will be noted that this rest is formed upon the same plane as the upper edge of the corrugated rim 5. The device thus constructed is placed above the chimney of an oil stove represented in dotted lines at 12 and a receptacle placed upon the rest 11, the result being that the heat rising from the oil stove will strike the bottom of the receptacle and will then pass to the sides and escape in the usual manner. Any contents of the receptacle which may boil over will be caught between the inclined portion 7 and the rim 5, thus preventing the fluid from coming into contact with the hot chimney of the stove.

It will thus be seen that I have created a very simple heat distributor and one which will function as above outlined.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. A heat distributor capable of being used in an oil stove consisting of an upstanding rim, a flat ring integral therewith, an annular upwardly inclined portion integral with said ring, a rib formed in said inclined member, and a transverse member extending between the opposite sides of said inclined member.

2. A heat distributor capable of being used in an oil stove consisting of an upstanding rim, a flat ring integral therewith, an annular upwardly inclined portion integral with said ring, a rib formed in said inclined member, a transverse member extending between the opposite sides of said inclined member, and a rest formed on said transverse member.

In testimony whereof I affix my signature.

DOIN KWON.